(12) United States Patent
Horiuchi et al.

(10) Patent No.: US 7,881,741 B2
(45) Date of Patent: Feb. 1, 2011

(54) MOBILE STATION APPARATUS AND WIRELESS COMMUNICATION METHOD

(75) Inventors: Ayako Horiuchi, Kanagawa (JP); Akihiko Nishio, Kanagawa (JP); Kenichi Miyoshi, Kanagawa (JP); Hiroaki Morino, Tokyo (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 11/908,699

(22) PCT Filed: Mar. 16, 2006

(86) PCT No.: PCT/JP2006/305282

§ 371 (c)(1),
(2), (4) Date: Sep. 14, 2007

(87) PCT Pub. No.: WO2006/101013

PCT Pub. Date: Sep. 28, 2006

(65) Prior Publication Data

US 2009/0061920 A1      Mar. 5, 2009

(30) Foreign Application Priority Data

Mar. 18, 2005   (JP) ............................. 2005-078848

(51) Int. Cl.
*H04B 7/00* (2006.01)
(52) U.S. Cl. ........................... 455/522; 455/69; 370/318
(58) Field of Classification Search ................... 455/69, 455/522; 370/318
See application file for complete search history.

(56) References Cited

U.S. PATENT DOCUMENTS

| 7,224,954 | B2 | 5/2007 | Okajima et al. |
| 2003/0224742 | A1 | 12/2003 | Sekine et al. |
| 2004/0192416 | A1 | 9/2004 | Sekine et al. |

FOREIGN PATENT DOCUMENTS

| JP | 2001 189971 | 7/2001 |
| JP | 2003 324373 | 11/2003 |
| JP | 2004 221655 | 8/2004 |
| JP | 2005 303910 | 10/2005 |

OTHER PUBLICATIONS

PCT International Search Report dated Jul. 11, 2006.

*Primary Examiner* — Raymond S Dean
(74) *Attorney, Agent, or Firm* — Dickinson Wright PLLC

(57) ABSTRACT

A mobile station wherein the power consumption can be suppressed. In a frame 3, this mobile station (100) transmits, to both a base station (200) and a relay station (150), a multicarrier signal comprising a plurality of subcarriers that have been controlled in transmission power on the basis of reception quality information 1 (Processes (3) and (3)': first transmission). In a frame 4, the mobile station (100) transmits, only to the base station (200), a multicarrier signal comprising a plurality of subcarriers that have been controlled in transmission power on the basis of reception quality information 2 (Process (5): second transmission). In this case, the mobile station (100) selects subcarriers in which reception qualities indicated by the reception quality information 2 are lower than a target quality, and the mobile station (100) then transmits, to the base station (200), a multicarrier signal comprising only those subcarriers in which the reception qualities are lower than the target quality.

10 Claims, 14 Drawing Sheets

MOBILE STATION APPARATUS AND WIRELESS COMMUNICATION METHOD

TECHNICAL FIELD

The present invention relates to a mobile station apparatus and wireless communication method. More particularly, the present invention relates to a mobile station apparatus and wireless communication method employing a multicarrier transmission scheme such as OFDM (Orthogonal Frequency Division Multiplex) scheme.

BACKGROUND ART

In recent years, with the multimediatization of information in cellular mobile communication systems as represented by mobile phones or the like, it is becoming popular to transmit not only audio data, but also a large amount of data such as still pictures, moving pictures and the like. To realize the transmission of such large amounts of data, a technology in which a high-frequency radio band is used to obtain a high-transmission rate is being actively studied.

However, when a high-frequency radio band is used, while a high transmission rate can be expected at a short range, attenuation due to transmission distance becomes greater, the longer the range. Accordingly, when the mobile communication system employing a high-frequency radio band is actually operated, the coverage area of each base station becomes small, which thus requires that a greater number of base stations be set up. Since the set-up of base stations involves large costs, a technology is strongly demanded for realizing communication services which employ a high-frequency radio band, while reducing an increase in the number of base stations.

To address these demands, a technology is investigated in which, a mobile station is used as a relay station, and a communication network formed directly between a base station and a mobile station, and a communication network (ad-hoc network) formed via the relay station are formed, and diversity gain is obtained by combining, at the base station, the received signals of both communication networks (for instance, refer to Patent Document 1).

Patent Document 1: Japanese Patent Application Laid-Open No. 2001-189971

DISCLOSURE OF INVENTION

Problems to be Solved by the Invention

However, since the mobile station may sometimes be used as a relay station in an ad-hoc network, the power consumption of the mobile station increases.

It is therefore an object of the present invention to provide a mobile station apparatus and wireless communication method capable of reducing power consumption.

Means for Solving the Problem

The mobile station apparatus of the present invention is used in a mobile communication system in which the mobile station apparatus transmits a multicarrier signal and in which a base station apparatus combines a multicarrier signal received directly from the mobile station apparatus and a multicarrier signal received from the mobile station apparatus via a relay station apparatus, to obtain received data, the mobile station apparatus employing a configuration providing: a control section that controls a transmission power of each of a plurality of subcarriers forming the multicarrier signal, in accordance with channel quality between the relay station apparatus and the base station apparatus; and a transmitting section that transmits the multicarrier signals comprising the subcarriers subjected to the transmission power control.

ADVANTAGEOUS EFFECTS OF THE INVENTION

According to the present invention, the power consumption of the mobile station can be reduced.

BEST MODE FOR CARRYING OUT THE INVENTION

Figure 1:
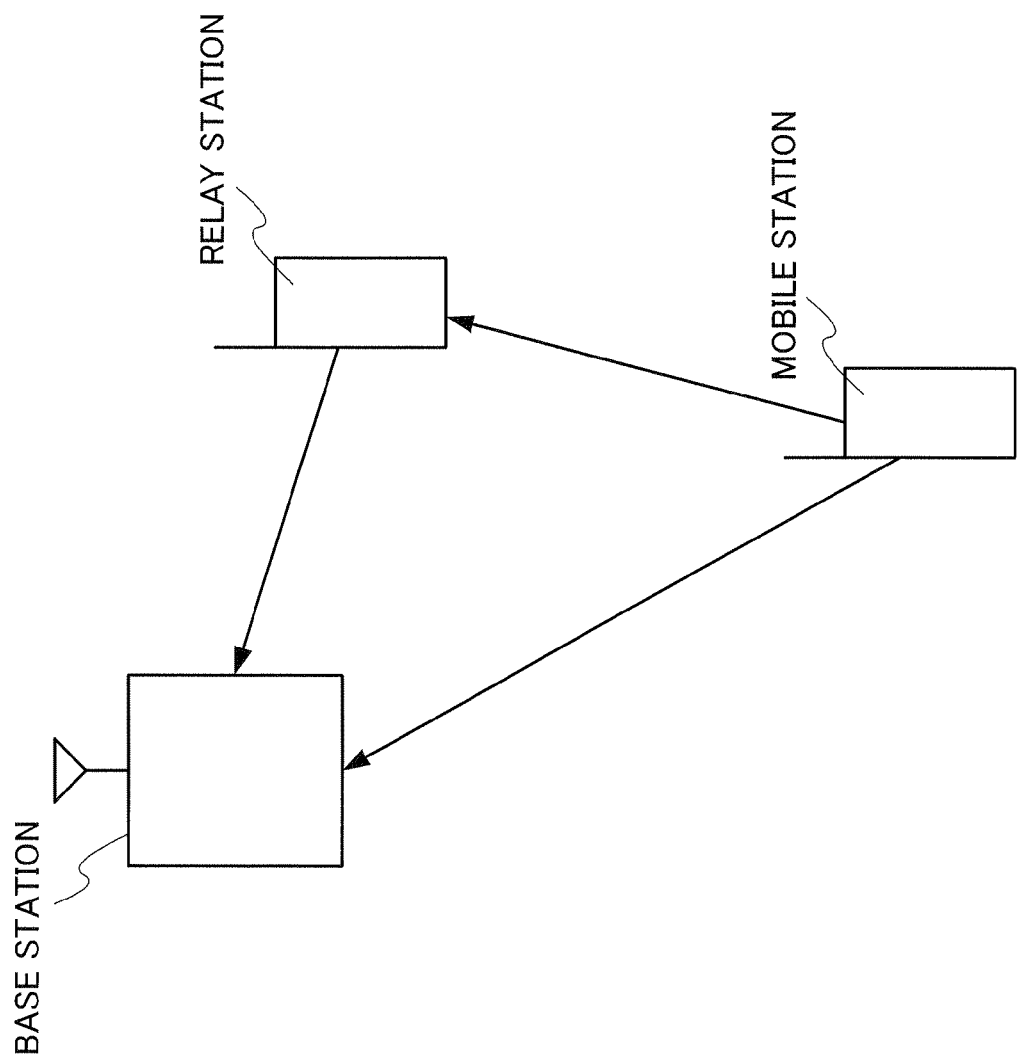
FIG. 1 is a configuration diagram of a mobile communication system according to each embodiment.

Next, the embodiments of the present invention will be described in detail, with reference to the accompanying drawings. In the mobile communication systems of the following embodiments, a mobile station apparatus (hereinafter simply referred to as "mobile station") transmits a multicarrier signal, a base station apparatus (hereinafter simply referred to as "base station") combines a multicarrier signal (first multicarrier signal) received directly from the mobile station and a multicarrier signal (second multicarrier signal) received from the mobile station via a relay station apparatus (hereinafter simply referred to as "relay station"), to obtain received data, as shown in FIG. 1. The relay station in the following embodiments may be a relay station set up in advance, or another mobile station may be employed as an ad-hoc network.

Embodiment 1

Figure 2:
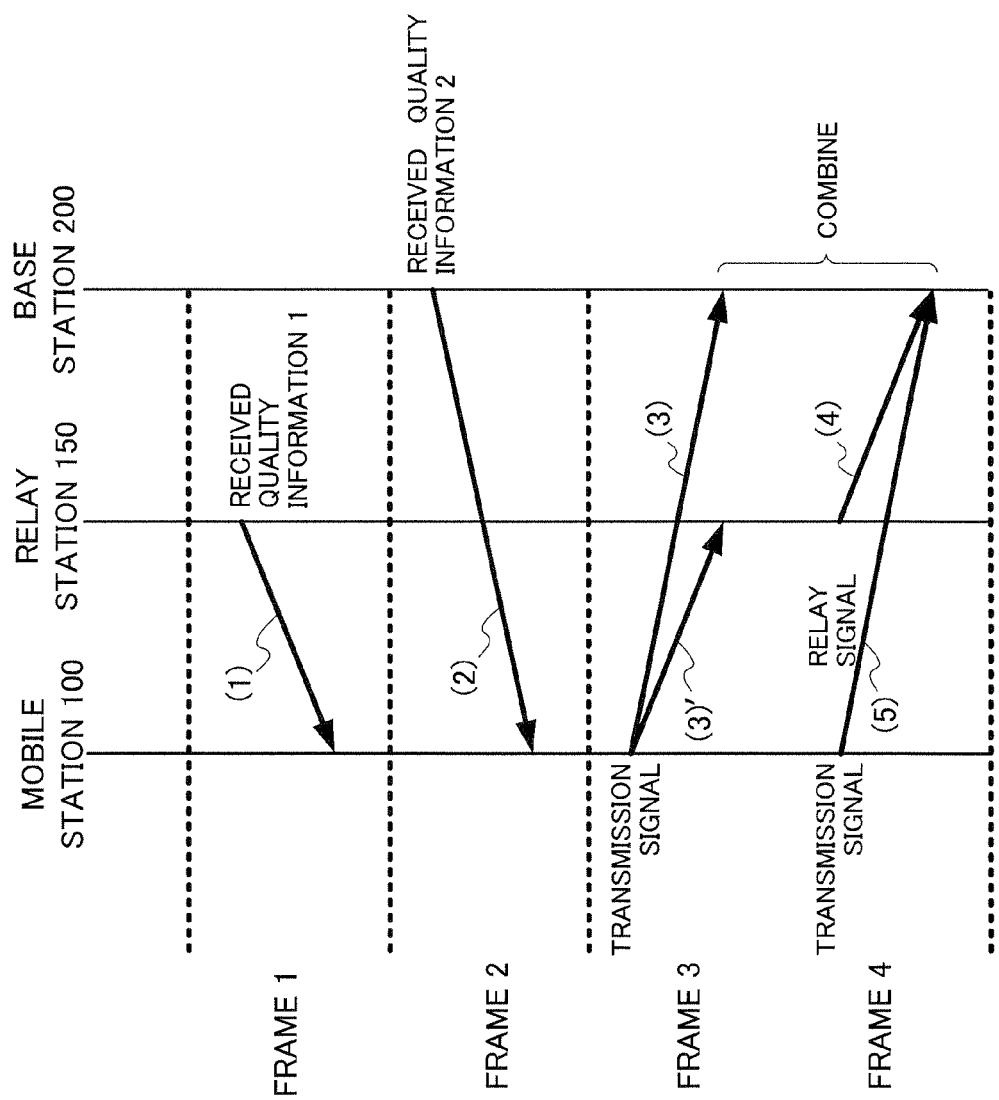
FIG. 2 is a sequence diagram according to embodiment 1.

First, the overall processing according to the present embodiment will be described, using the sequence diagram shown in FIG. 2.

In a frame 1, relay station 150 measures the received intensity level, as received quality, of each of a plurality of subcarriers which compose a multicarrier signal received from mobile station 100, and transmits received quality information 1 which indicates this received quality, to mobile station 100 (process (1)). This received quality corresponds to the channel quality between mobile station 100 and relay station 150.

If the mobile communication system shown in FIG. 1 is a TDD (Time Division Duplex)-type communication system, the correlation between the uplink channel characteristic and the downlink channel characteristic is extremely high, which enables mobile station 100 to estimate the received quality measured at relay station 150, from the received quality of the signal transmitted from relay station 150. Accordingly, in this case, process (1) in frame 1 needs not be carried out.

Also, in a frame 2, base station 200 measures the received intensity level, as received quality, of each of a plurality of subcarriers that compose a multicarrier signal received from relay station 150, and transmits received quality information 2 which indicates this received quality, to mobile station 100 (process (2)). This received quality corresponds to the channel quality between relay station 150 and base station 200.

Next, in a frame 3, mobile station 100 transmits the multicarrier signal comprising a plurality of subcarriers subjected to transmission power control based on received quality information 1, both to base station 200 and relay station 150 (processes (3) and (3)': first transmission). At this time, mobile station 100 performs control to increase the transmission power of the subcarriers of lower received quality and reduce the transmission power of the subcarriers of higher received quality.

The multicarrier signal transmitted in frame 3 has its transmission power controlled based on the received quality at relay station 150, which is provided relatively close to mobile station 100, and, since the transmission power of each subcarrier is controlled to be a power that minimally satisfies a target quality at relay station 150, the received quality of this multicarrier signal at base station 200, which is provided further away from mobile station 100 than relay station 150, becomes considerably low, and therefore, base station 200 needs not receive the multicarrier signal transmitted in frame 3.

Next, in a frame 4, relay station 150 relays the multicarrier signal received from mobile station 100 in frame 3 and transmits the signal to base station 200 (process (4)). Also, at the same time, mobile station 100 transmits the multicarrier signal comprising a plurality of subcarriers subjected to transmission power control based on received quality information 2, only to base station 200 (process (5): second transmission). At this time, mobile station 100 selects the subcarriers where received quality indicated by received quality information 2 are below the target quality, and transmits the multicarrier signal comprising only the subcarriers where received quality is below the target quality, to base station 200. Also, mobile station 100 performs control to increase the transmission power of the subcarriers of lower received quality and decrease the transmission power of subcarriers of higher received quality.

Then, base station 200 combines all the multicarrier signals transmitted in processes (3), (4) and (5) on a per subcarrier basis and obtains received data.

Here, in processes (3) and (3'), mobile station 100 controls the transmission power of each subcarrier to be a power that minimally satisfies the target value at relay station 150, which is provided relatively close to mobile station 100, while, in process (5), mobile station 100 controls the transmission power to be a power that minimally satisfies the target value at base station 200, which is provided further away from mobile station 100 than relay station 150, and therefore, the transmission power of each subcarrier in process (5) is controlled to be higher than the transmission power in processes (3) and (3)'.

Each transmission timing is preferably controlled such that the receiving timing at base station 200 is the same in the transmission in process (3) and in the transmission in process (4). Also, process (2) may be carried out in frame 3, and processes (3) and (3)' may be carried out in frame 2.

Figure 3:
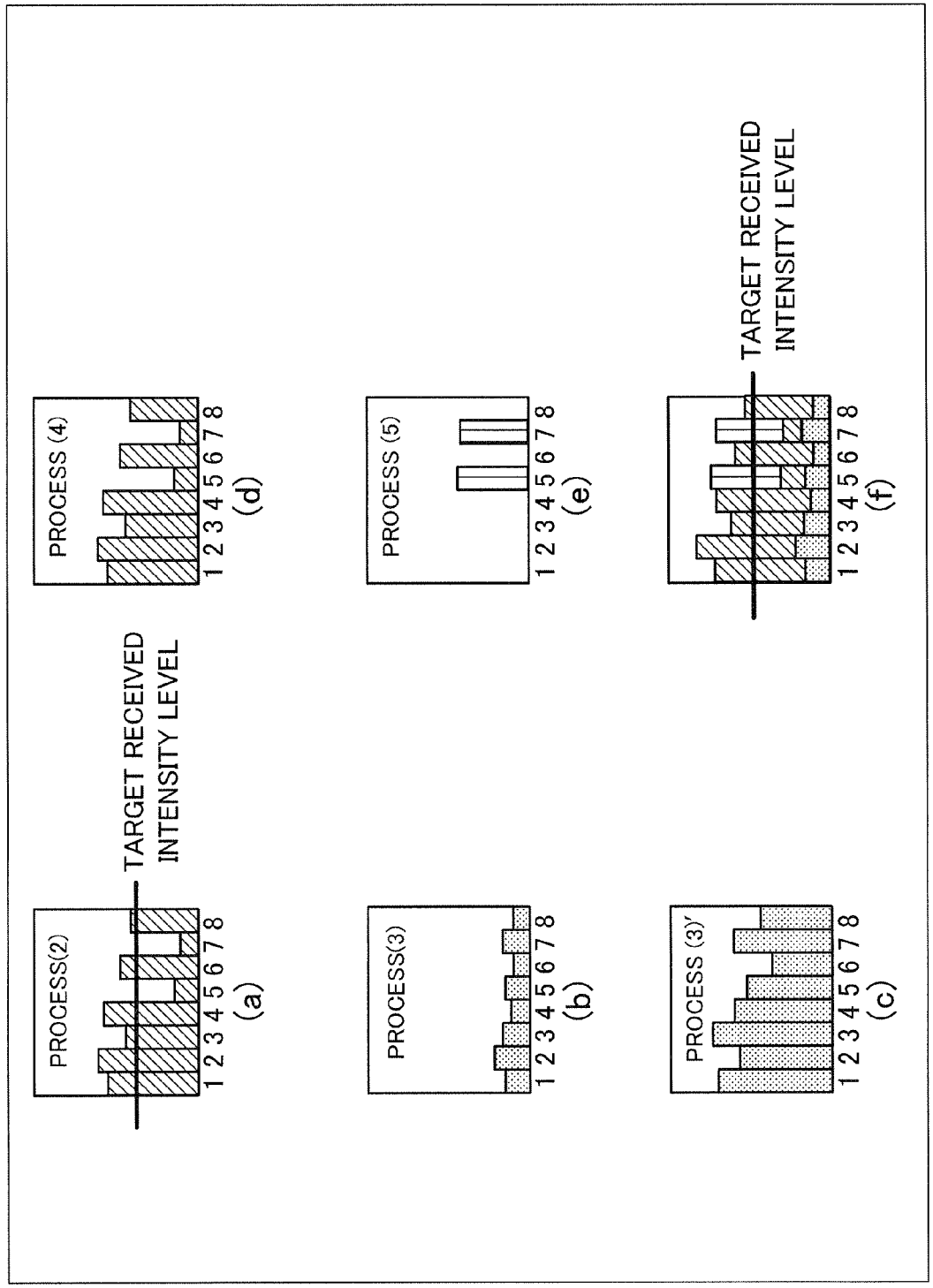
FIG. 3 is a view showing examples of the received intensity levels of subcarriers, according to embodiment 1.

Next, examples of received intensity levels at relay station 150 and base station 200 will be shown in FIGS. 3(*a*) through (*f*). FIGS. 3(*a*) through (*f*) show examples of a case where a multicarrier signal is comprised of subcarriers 1 through 8, where the numbers 1 through 8 on the horizontal axis show the subcarrier numbers. The same applies to later embodiments as well.

FIG. 3(*a*) shows the received intensity levels reported by received quality information 2, which is transmitted from base station 200 to mobile station 100, in process (2). These received intensity levels are predicted received intensity levels of the multicarrier signal transmitted from relay station 150 to base station 200 in process (4) at base station 200. That is to say, with the relay signal transmitted from relay station 150 in process (4) alone, the received intensity level is low with subcarriers 5 and 7 and does not reach a target received intensity level.

FIG. 3(*b*) shows the received intensity levels, at base station 200, of the multicarrier signal which is subjected to transmission power control based on received quality information 1 in process (1) and which is transmitted in process (3), at base station 200. Also, FIG. 3(*c*) shows the received intensity level, at relay station 150, of the multicarrier signal where transmission power is controlled based on received quality information 1 in process (1) and which is transmitted in process (3)'. The multicarrier signals transmitted in processes (3) and in process (3)' are the same as the multicarrier signal subjected to the same transmission power control at mobile station 100. Here, the reason that the received intensity levels shown in FIG. 3(*b*) are lower than the received intensity levels shown in FIG. 3(*c*) is that, since the distance between mobile station 100 and base station 200 is greater than the distance between mobile station 100 and relay station 150, the attenuation of the multicarrier signal received at base station 200 due to the transmission distance is greater.

FIG. 3(*d*) shows the received intensity levels, at base station 200, of the multicarrier signal transmitted from relay station 150 to base station 200 in process (4).

FIG. 3(*e*) shows the received intensity levels, at base station 200, of the multicarrier signal transmitted directly from mobile station 100 to base station 200 in process (5). As described above, since in process (5), mobile station 100 transmits a multicarrier signal comprised of only subcarriers 5 and 7, where the received intensity level is below the target received intensity level, as shown in FIG. 3(*a*), FIG. 3(*e*) shows the received intensity levels of only subcarriers 5 and 7.

Then, base station 200 combines the multicarrier signals shown in FIGS. 3(*b*), (*d*) and (*e*) on a per subcarrier basis and obtains a multicarrier signal having the received intensity levels shown in FIG. 3(*f*). As a result of this combination, subcarriers 5 and 7 now reach the target received intensity level.

In this way, base station 200 can compensate for the portion of the signal transmitted from relay station 150 in process (4), where the received quality is low (e.g., subcarriers 5 and 7, from the subcarriers shown in FIG. 3(*d*), where the received intensity level does not reach the target received intensity level), by the signal transmitted from mobile station 100 in process (5) (FIG. 3(e)).

Also, since mobile station 100 controls, in processes (3) and (3)', the transmission power of each subcarrier, based on the received quality at relay station 150, which is provided relatively close to mobile station 100, and thus controls the transmission power of each subcarrier to be a power that minimally satisfies the target quality at relay station 150, the transmission power of the multicarrier signals transmitted in processes (3) and (3)' becomes relatively low. Also, since mobile station 100 transmits, in process (5), only a part of the subcarriers that have a low received quality, it is possible to reduce the transmission power all subcarriers are transmitted. Thus, mobile station 100 can reduce the transmission power of the multicarrier signal. As a result, mobile station 100 is able to reduce power consumption.

Figure 4:
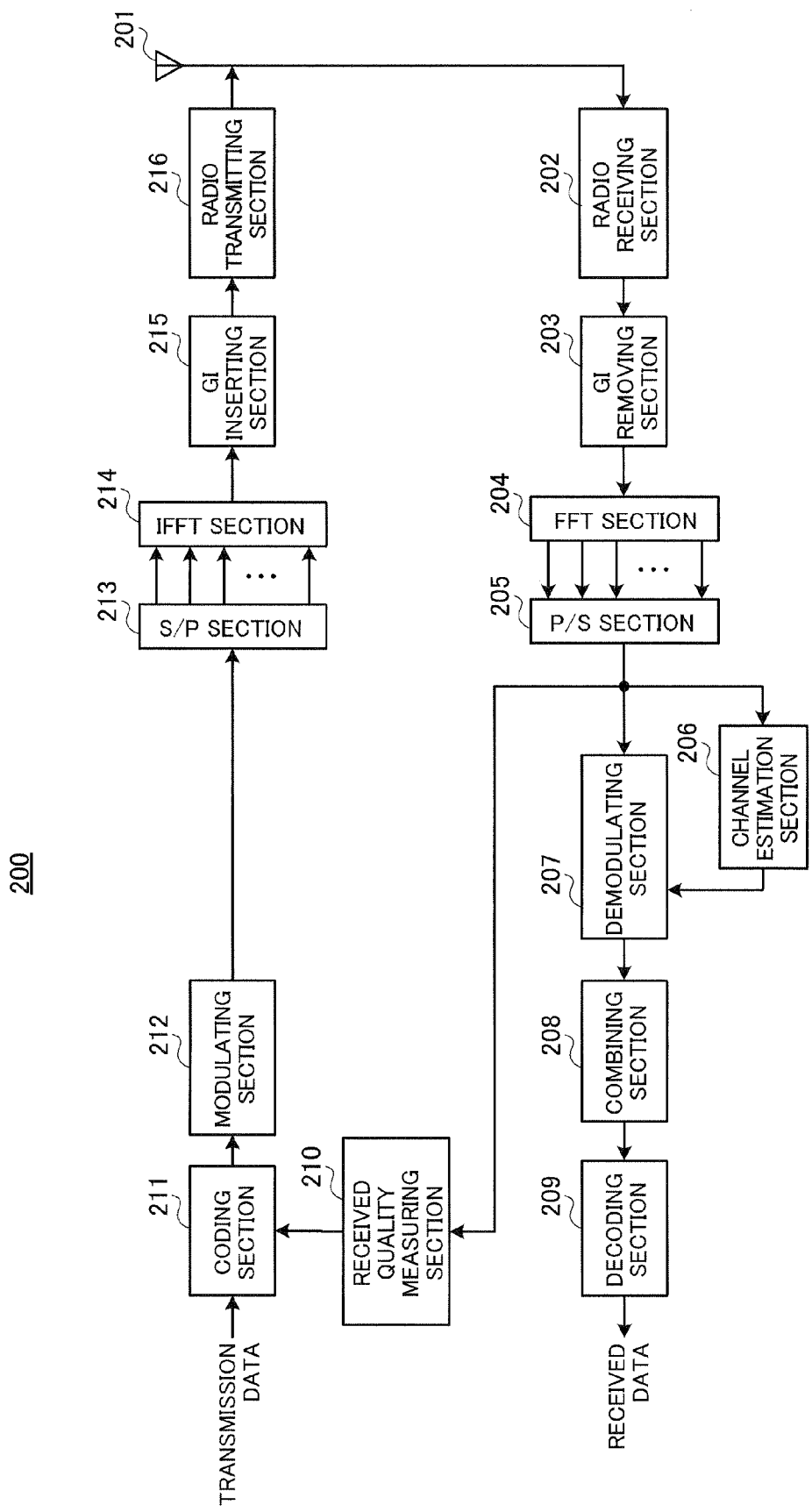
FIG. 4 is a block diagram showing a configuration of a base station according to embodiment 1.

Next, the configuration of base station 200 will be described. The configuration of base station 200 is shown in FIG. 4.

In base station 200, radio receiving section 202 receives the multicarrier signal from mobile station 100 and the multicarrier signal from relay station 150, via antenna 201, and performs radio processing including down-conversion, on the received signal to obtain the baseband signal.

GI removing section 203 removes the guard interval (GI) from the baseband signal.

FFT section 204 performs FFT processing on the baseband signal, in which the baseband signal is converted from the time domain into the frequency domain, and obtains the signals of individual subcarriers and inputs these subcarrier signals to P/S section 205.

P/S section 205 converts the subcarriers signals inputted in parallel into serial signals, and inputs these serial signals into to channel estimation section 206 and demodulating section 207. As for the multicarrier signal from relay station 150, P/S section 205 inputs subcarrier signals converted into serial signals, to received quality estimation section 210 as well.

Channel estimation section 206 estimates the channel of each subcarrier and generates channel estimation values. These channel estimation values are inputted to demodulating section 207.

Demodulating section 207 reduces errors that occur due to the influence of amplitude variations and phase variations between channels and demodulates signals, by dividing the subcarrier signals inputted, by the corresponding subcarrier-specific channel estimation values. The demodulated signals are inputted to combining section 208.

Combining section 208 combines the signal inputted directly from the mobile station and the signal inputted from the mobile station via the relay station, on a per subcarrier basis, and inputs the result to decoding section 209.

Decoding section 209 decodes the combined signals and by this means obtains received data.

On the other hand, received quality measuring section 210 measures the received intensity level, as received quality, of each subcarrier of the multicarrier signal transmitted from relay station 150, and generates received quality information (the above received quality information 2) indicating this received quality. This received quality information is inputted to coding section 211.

Coding section 211 performs encoding such as turbo coding on the inputted time-serial transmission data and received quality information, and inputs the encoded transmission data to modulating section 212.

Modulating section 212 performs modulation such as QPSK and 16QAM on the transmission data and received quality information, and inputs the modulated transmission signal and the received quality information to S/P section 213.

S/P section 213 converts the subcarrier signals inputted in series, into parallel signals, and inputs these parallel signals to IFFT section 214. Also, S/P section 213 allocates received quality information to predetermined subcarriers.

IFFT section 214 performs IFFT processing on the inputted signals, in which the frequency domain signals are converted into a time domain multicarrier signal, and inputs this signal to GI inserting section 215.

GI inserting section 215 inserts a guard interval into the multicarrier signal and outputs the signal to radio transmitting section 216.

Radio transmitting section 216 performs radio processing including up-conversion, on the multicarrier signal, and transmits the result from antenna 201. At this time, the multicarrier signal including received quality information is transmitted to mobile station 100.

Figure 5:
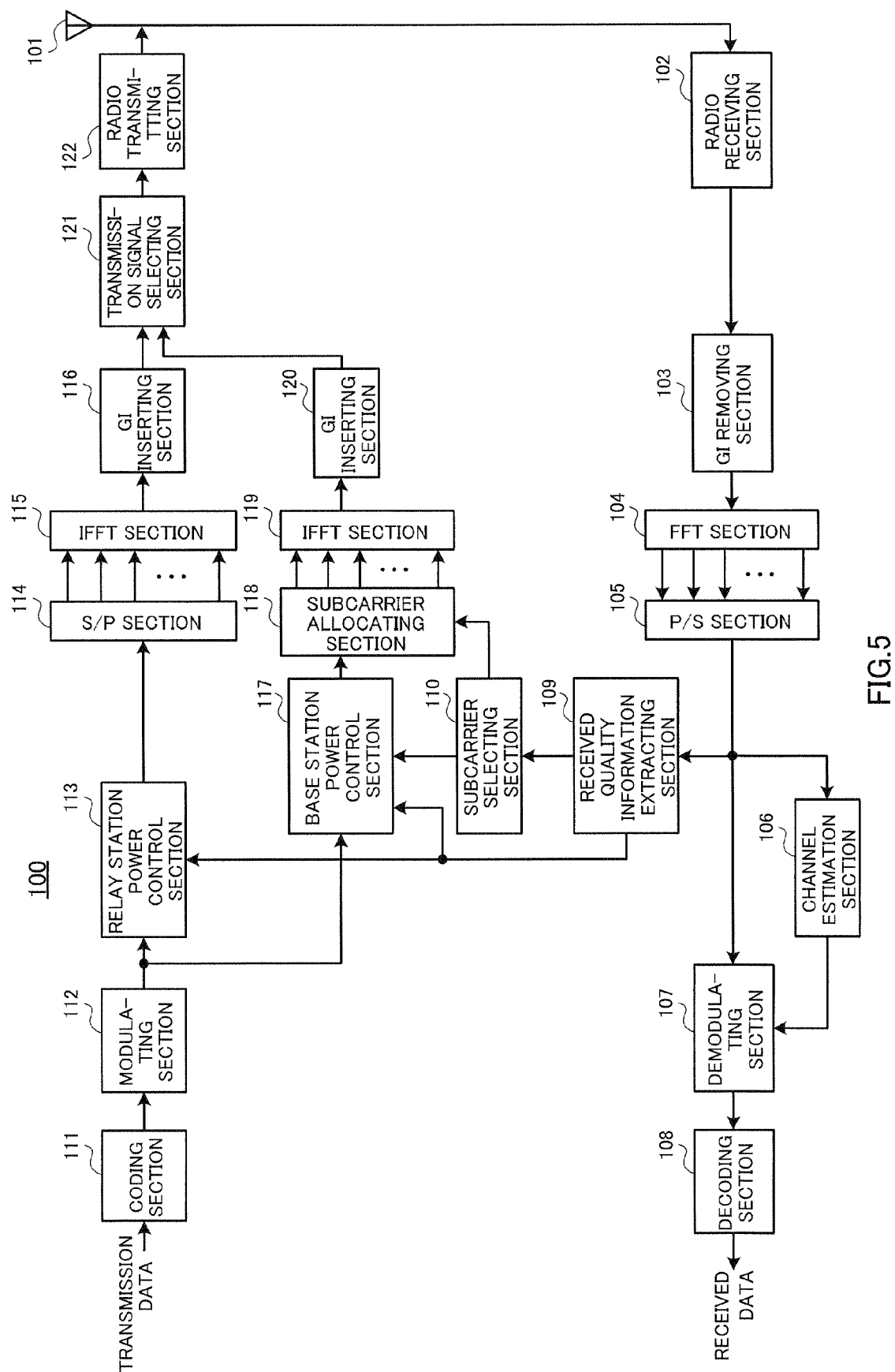
FIG. 5 is a block diagram showing a configuration of a mobile station according to embodiment 1.

Next, the configuration of mobile station 100 will be described. The configuration of mobile station 100 is shown in FIG. 5.

In mobile station 100, radio receiving section 102 receives the multicarrier signal from relay station 150 and the multicarrier signal from base station 200, via antenna 101, and performs radio processing including down-conversion on the received signals and obtains the baseband signal. The multicarrier signal from relay station 150 includes information about the received quality at relay station 150 (the above received quality information 1), and the multicarrier signal from base station 200 includes information about the received quality at base station 200 (the above received quality information 2).

GI removing section 103 removes the guard interval (GI) from the baseband signal.

FFT section 104 performs FFT processing on the baseband signal, in which the baseband signal is converted from the time domain into the frequency domain, to obtain signals of individual subcarriers, and inputs these subcarrier signals to P/S section 105.

P/S section 105 converts the subcarrier signals inputted in parallel, into serial signals, and inputs these serial signals to channel estimation section 106, demodulating section 107 and received quality information extracting section 109.

Channel estimation section 106 estimates the channel of each subcarrier and generates channel estimation values. The channel estimation values are inputted to demodulating section 107.

Demodulating section 107 reduces errors that occur due to the influence of amplitude variations and phase variations between channels and demodulates signals, by dividing the subcarrier signals inputted, by the corresponding subcarrier-specific channel estimation values. The demodulated signals are inputted to decoding section 108.

Decoding section 108 decodes the inputted signals and by this means obtains received data.

Meanwhile, received quality information extracting section 109 extracts the above received quality information 1 and received quality information 2 from the inputted signals, and inputs received quality information 1 to relay station power control section 113 and received quality information 2 to subcarrier selecting section 110 and base station power control section 117.

Subcarrier selecting section 110 selects the subcarriers where received quality is below the target quality, based on received quality information 2, and inputs the number of the selected subcarriers to base station power control section 117 and subcarrier allocating section 118, as a selection result.

Coding section 111 performs encoding such as turbo coding on the inputted time-serial transmission data, and inputs the encoded transmission data to modulating section 112.

Modulating section 112 performs modulation such as QPSK, 16QAM on the transmission data and inputs the modulated transmission signal to relay station power control section 113 and base station power control section 117.

Relay station power control section 113 controls the transmission power for the subcarrier signals inputted, based on received quality information 1, and inputs this to S/P section 114.

S/P section 114 converts the subcarrier signals inputted in series, into parallel signals, and outputs these parallel signals to IFFT section 115.

IFFT section 115 performs IFFT processing on the inputted signals, in which the frequency domain signals are converted into a time domain multicarrier signal, and inputs this multicarrier signal to GI inserting section 116. The multicarrier signal generated at IFFT section 115 is a signal to be transmitted to relay station 150.

GI inserting section 116 inserts a guard interval into the multicarrier signal inputted from IFFT section 115, and inputs the signal to transmission signal selecting section 121.

Base station power control section 117 controls the transmission power of the signals to be allocated to the subcarriers indicated by the selection result, based on received quality information 2, and inputs the result to subcarrier allocating section 118. At this time, base station power control section 117 sets the transmission power of the signals to be allocated to subcarriers other than the subcarriers selected by subcarrier selecting section 110, to zero. In other words, only the signals to be allocated to the subcarriers selected by subcarrier selecting section 110 are inputted to subcarrier allocating section 118.

Subcarrier allocating section 118 allocates the signals inputted from base station power control section 117 to subcarriers, in accordance with the selection result, and inputs the result to IFFT section 119.

IFFT section 119 performs IFFT processing on the inputted signals, in which the frequency domain signals are converted into a time domain multicarrier signal, and inputs this multicarrier signal to GI inserting section 120. e multicarrier signal generated by IFFT section 119 is a signal to be transmitted directly to base station 200.

GI inserting section 120 inserts a guard interval into the multicarrier signal inputted from IFFT section 119, and inputs this signal to transmission signal selecting section 121.

Transmission signal selecting section 121 selects the multicarrier signal to be transmitted. In other words, transmission signal selecting section 121 selects the signal inputted from GI inserting section 116 in frame 3 shown in the above FIG. 2, and the signal inputted from GI inserting section 120 in frame 4, and inputs these signals to radio transmitting section 122. As a result of this selection, in the second transmission in frame 4, a multicarrier signal comprised of only the subcarriers where received quality at base station 200 is below the target quality is transmitted only to base station 200.

Radio transmitting section 122 performs radio processing including up-conversion on the multicarrier signal and transmits the result from antenna 101.

Figure 6:
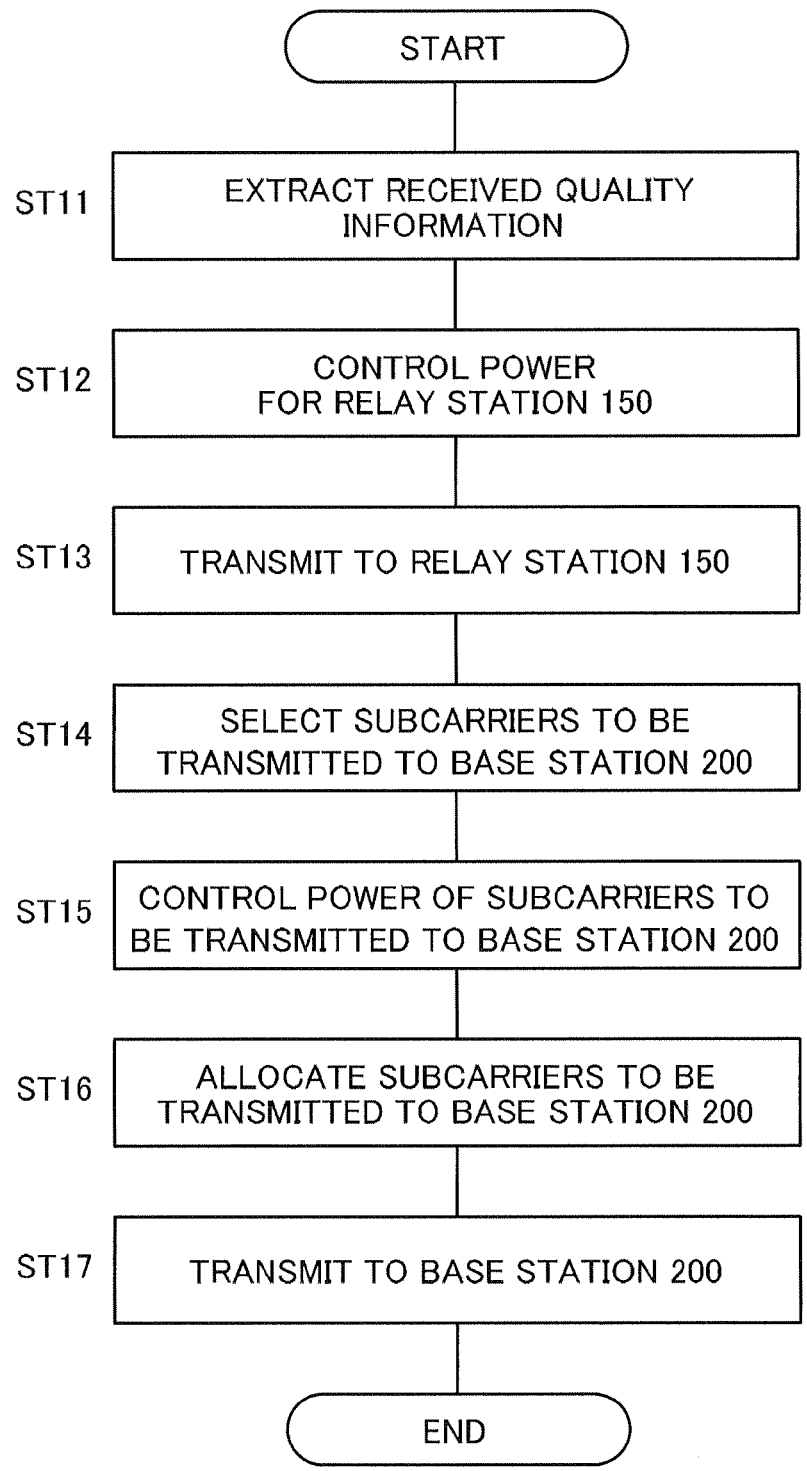
FIG. 6 is an operation flow chart of the mobile station according to embodiment 1.

Next, the operation flow of mobile station 100 will be described using the flow chart of FIG. 6.

In ST (step) 11, received quality information 1 is extracted from the multicarrier signal transmitted from relay station 150, and received quality information 2 is extracted from the multicarrier signal transmitted from base station 200.

Next, in ST12, transmission power control for relay station 150 is performed. This transmission power control is performed for all subcarriers, based on received quality information 1.

Then, in ST13, the multicarrier signal comprising subcarriers subjected to transmission power control in ST12, is transmitted to relay station 150 (first transmission).

Next, in ST14, the subcarrier to be transmitted directly to base station 200 is selected. In this selection, subcarriers where received quality is below the target quality, are selected based on received quality information 2.

Next, in ST15, transmission power control for base station 200 is carried out. This transmission power control is performed for the subcarriers selected in ST14, based on received quality information 2.

Next, in ST16, the subcarriers selected in ST14 are allocated.

Then, in ST17, a multicarrier signal which is comprised of the subcarriers which are selected in ST14 and which are subjected to transmission power control in ST15, is transmitted to base station 200 (second transmission).

In this way, since the mobile station according to the present embodiment transmits, in a first transmission, a multicarrier signal at a transmission power that minimally satisfies a target quality at the relay station, and transmits, in a second transmission, only the subcarriers where received quality at the base station is below the target quality, the transmission power of the mobile station can be reduced, so that the power consumption by the mobile station is reduced.

Embodiment 2

Figure 7:
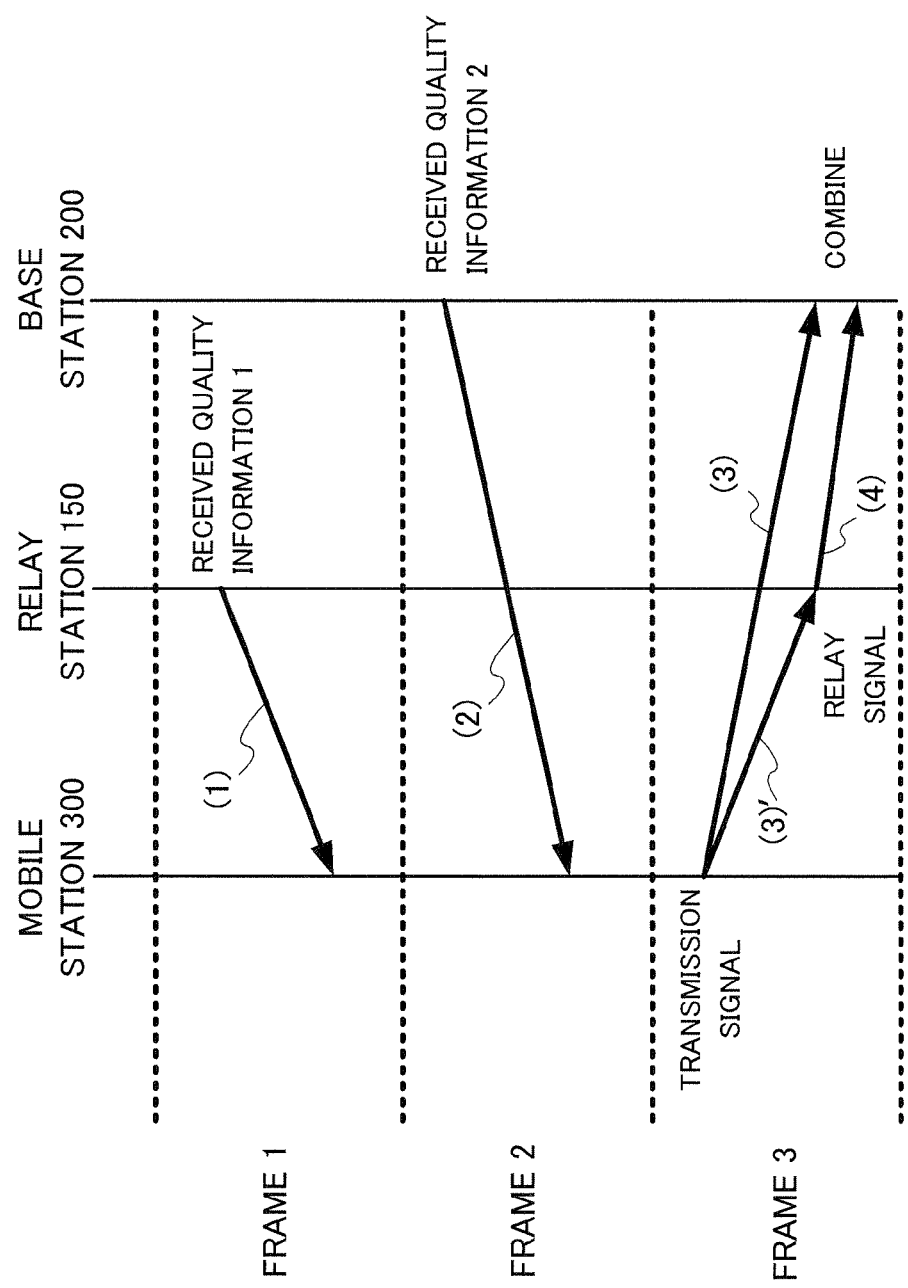
FIG. 7 is a sequence diagram according to embodiment 2.

First, the entire processing of the present embodiment will be described using the sequence diagram shown in FIG. 7.

Processes (1) and (2) in frame 1 and frame 2 are the same as those of embodiment 1 (FIG. 2), and therefore, further description thereof is hereby omitted.

Next, in frame 3, mobile station 300 transmits a multicarrier signal comprised of a plurality of subcarriers which are subjected to transmission power control based on received quality information 1 and received quality information 2, to both base station 200 and relay station 150 (processes (3) and (3)'). At this time, mobile station 300 performs control to increase the transmission power of the subcarriers of lower received quality and reduce the transmission power of the subcarriers of higher received quality. Also, mobile station 300 controls the transmission power to relay station 150, of the subcarriers where received quality is equal to or above the target quality, based on received quality information 1, and the transmission power to base station 200, of the subcarriers where received quality is below the target quality, based on received quality information 2. In other words, mobile station 300 controls the transmission power of the subcarriers where received quality is equal to or above the target quality, to be a power minimally satisfying the target quality at relay station 150, and controls the transmission power of the subcarriers where received quality is below the target quality to be a power minimally satisfying the target quality at base station 200. Here, since base station 200 is provided further away from mobile station 300, than relay station 150, the attenuation due to transmission distance becomes greater in the case of the multicarrier signal received at base station 200. Therefore, by performing this transmission power control at mobile station 300, the transmission power of the subcarriers composing the multicarrier signal transmitted in frame 3, where received quality is below the target quality is controlled to be greater than the transmission power of subcarriers where received quality is equal to or above the target quality.

Further, in frame 3, relay station 150 relays the multicarrier signal received from mobile station 300, and transmits it to base station 200 (process (4)).

Then, base station 200 combines the subcarriers of the multicarrier signal transmitted in processes (3) and (4), to obtain received data.

Next, examples of the received intensity levels at relay station 150 and base station 200 will be shown in FIGS. 8(a) through (e).

Figure 8:
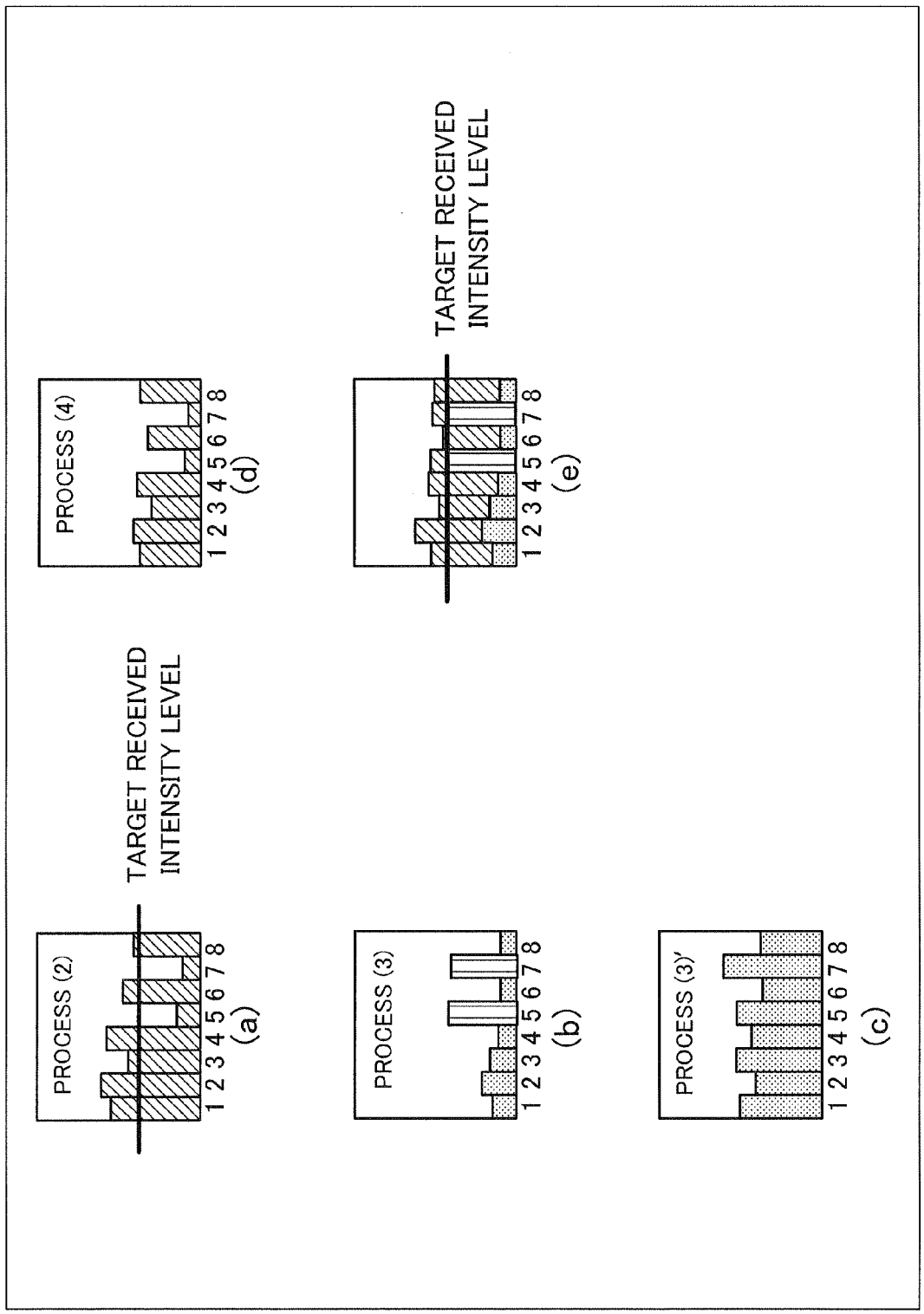
FIG. 8 is a view showing examples of the received intensity levels of subcarriers according to embodiment 2.

FIG. 8(a) shows the received intensity levels reported by received quality information 1 transmitted from base station 200 to mobile station 300 in process (2). These received intensity levels are received intensity levels of the multicarrier signal transmitted from relay station 150 to base station 200, as predicted at base station 200. That is to say, with the relay signal transmitted from relay station 150 alone, the received intensity level is low with subcarriers 5 and 7 and does not reach a target received intensity level.

FIG. 3(b) shows the received intensity levels, at base station 200, of the multicarrier signal which is subjected to transmission power control based on received quality information 1 and received quality information 2 and which is transmitted in process (3). Also, FIG. 8(c) shows the received intensity level, at relay station 150, of the multicarrier signal which is transmitted in process (3)', and which is subjected to transmission power control based on received quality information 1 and received quality information 2. The multicarrier signals transmitted in processes (3) and in process (3)' are the same as the multicarrier signal subjected to the same transmission power control at mobile station 300. In this transmission power control, mobile station 300 performs transmission power control for base station 200, on subcarriers 5 and 7, from amongst the subcarriers shown in FIG. 8(a), where the received intensity level does not reach the target received intensity level (that is, where received quality is low), based on received quality information 2, as described above, and performs transmission power control for relay station 150 on subcarriers 1, 2, 3, 4, 6 and 8 where the received intensity level reaches the target received intensity level (that is, where received quality is high), based on received quality information 1, as described above. The reason that the received intensity levels shown in FIG. 8(b) are lower than the received intensity levels shown in FIG. 8(c) is that, since the distance between mobile station 300 and base station 200 is greater than the distance between mobile station 300 and relay station 150, attenuation due to the transmission distance is greater in the case of the multicarrier signal received at base station 200.

FIG. 8(d) shows the received intensity levels, at base station 200, of the multicarrier signal transmitted from relay station 150 to base station 200 in process (4).

Then, base station 200 combines the subcarriers of the multicarrier signals shown in FIGS. 8(b) and (d), to obtain the multicarrier signal having the received intensity levels shown in FIG. 8(e). As a result of this combination, subcarriers 5 and 7, as well, reach the target received intensity level.

In this way, base station 200 can compensate the portion of the signal transmitted from relay station 150 in process (4), in which the received quality is low (in particular, subcarriers 5 and 7, from the subcarriers shown in FIG. 8(d), where the received intensity level does not reach the target received intensity level), by the signal transmitted from mobile station 300 in process (3) (FIG. 8(b)).

Also, while mobile station 100 according to embodiment 1 requires a second transmission to set the received intensity levels of all subcarriers at base station 200 to the target received intensity level, mobile station 300 according to the present embodiment achieves this in one transmission, and, therefore, the power consumption of the mobile station can be reduced even more.

Figure 9:
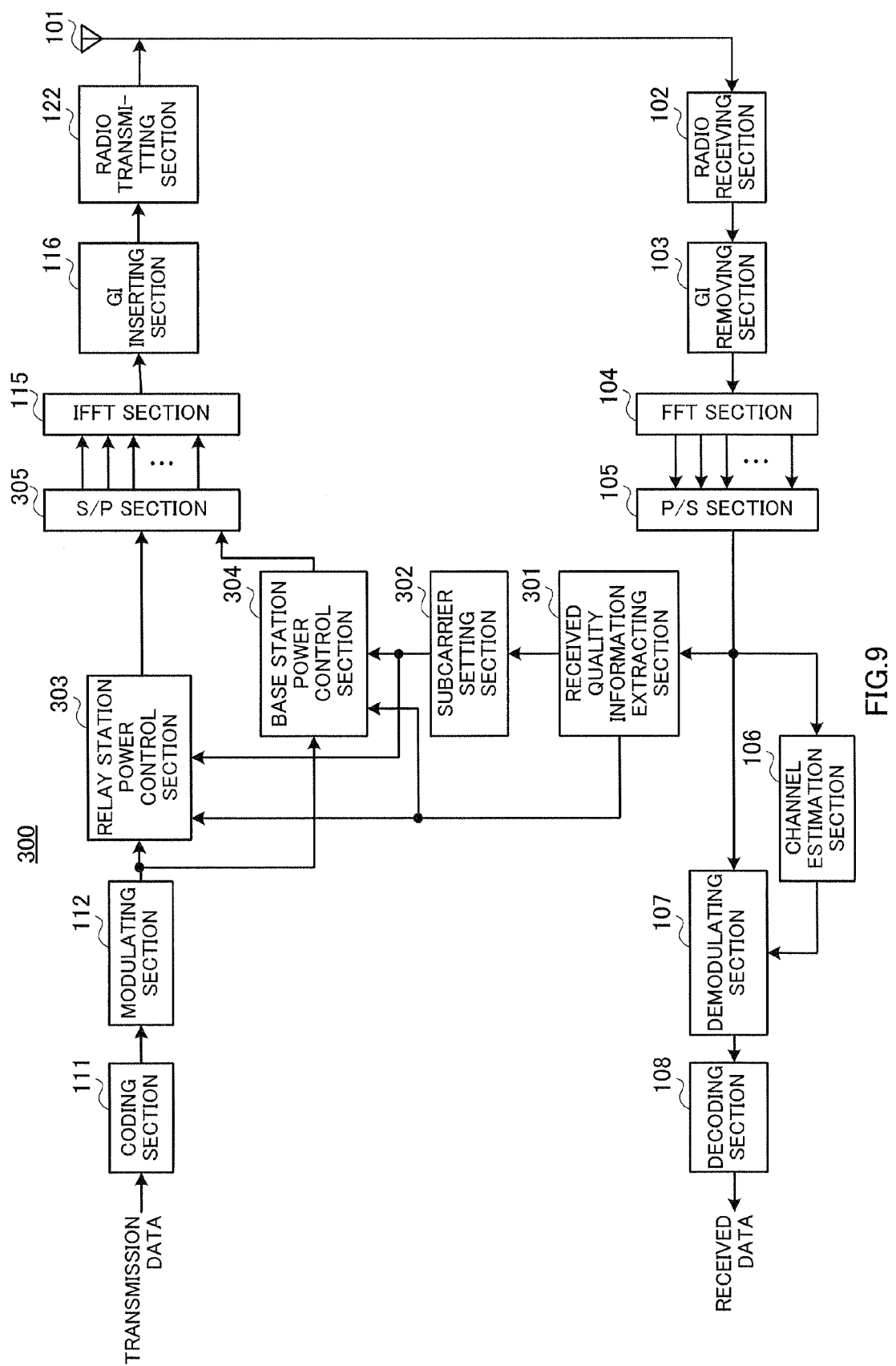
FIG. 9 is a block diagram showing a configuration of a mobile station according to embodiment 2.

Next, the configuration of mobile station 300 will be described. The configuration of mobile station 300 is shown in FIG. 9. Components in FIG. 9 that are the same as those of embodiment 1 (FIG. 5) are designated by the same numeric symbols, and further description thereof is hereby omitted.

In mobile station 300, received quality information extracting section 301 extracts the above received quality information 1 from the inputted signal, and inputs this information to relay station power control section 303. Also, received quality information extracting section 301 extracts the above-described received quality information 2 from the inputted signal and inputs it to subcarrier setting section 302 and base station power control section 304.

Subcarrier setting section 302 sets the subcarriers where received quality is equal to or above the target quality to relay station power control section 303 based on received quality information 2, and the subcarriers where received quality is below the target quality to base station power control section 304. The setting information showing the results of this setup is inputted to relay station power control station 303 and base station power control station 304. In this way, subcarrier setting section 302 causes relay station power control section 303 to control the transmission power of the subcarriers where received quality is equal to or above the target quality, and causes base station power control section 304 to control the transmission power of the subcarriers where received quality is below the target quality.

Relay station power control section 303 controls, as described above, the transmission power of the signals, from amongst the inputted subcarrier signals, which are allocated to the subcarriers where received quality is equal to or above the target quality, based on received quality information 1, and inputs the result to S/P section 305. At this time, relay station power control section 303 sets the transmission power of the signals allocated to the subcarriers where received quality is below the target quality, to zero. That is, only the signals allocated to the subcarriers where received quality is equal to or above the target quality are inputted from relay station power control section 303 to S/P section 305.

Meanwhile, base station power control section 304 controls, as described above, the transmission power of the signals, from amongst the inputted subcarrier signals, which are allocated to the subcarriers where received quality is below the target quality, based on received quality information 2, and inputs the result to S/P section 305. At this time, base station power control section 304 sets the transmission power of the signals allocated to the subcarriers where received quality is equal to or above the target quality, to zero. That is, only the signals allocated to the subcarriers where received quality is below the target quality are inputted from base station power control section 304 to S/P section 305.

S/P section 305 converts the subcarrier signals inputted in series from relay station power control section 303 and base station power control section 304, to parallel signals, and inputs these parallel signals to IFFT section 115.

Figure 10:
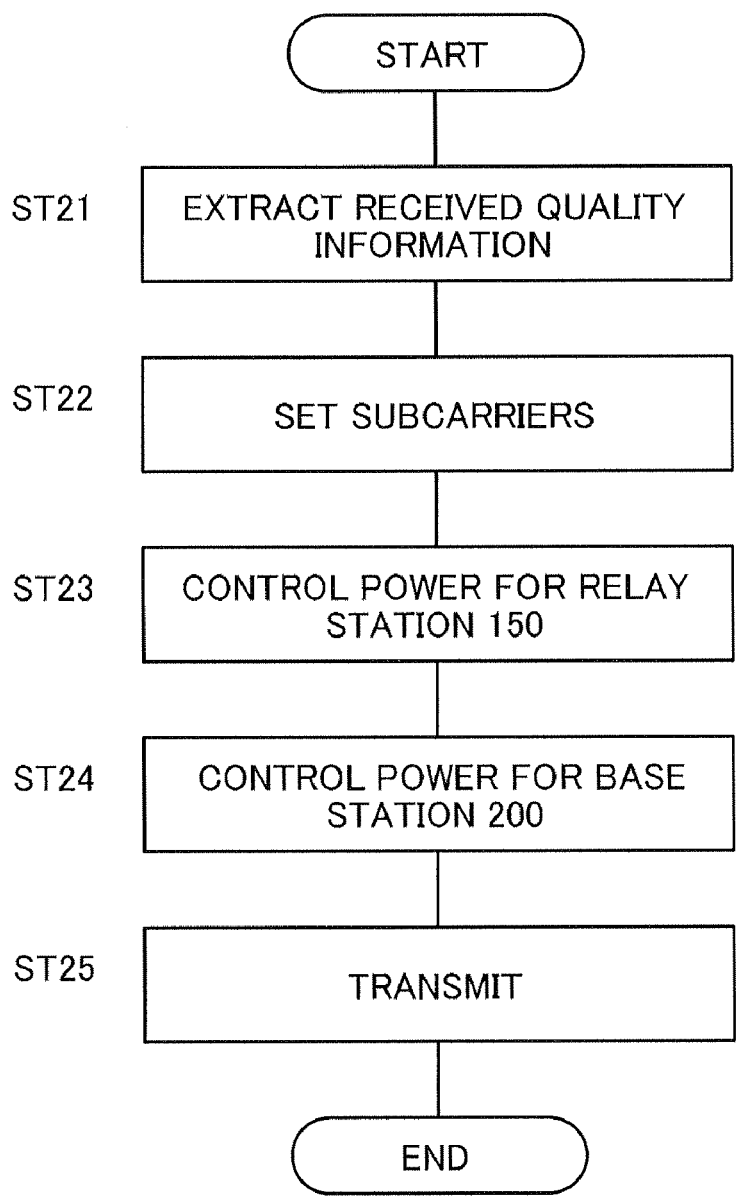
FIG. 10 is an operation flow chart of the mobile station according to embodiment 2.

Next, the operation flow of mobile station 300 will be described using the flow chart of FIG. 10.

In ST21, received quality information 1 is extracted from the multicarrier signal transmitted from relay station 150, and received quality information 2 is extracted from the multicarrier signal transmitted from base station 200.

Next, in ST22, the subcarriers where received quality is equal to or above the target quality are set as the object of transmission power control at relay station 150, based on received quality information 2, and the subcarriers where received quality is below the target quality are set as the object of transmission power control at base station 200.

Next, in ST23, the transmission power of the subcarriers where received quality at relay station 150 is equal to or above the target quality is controlled based on received quality information 1, and, in ST24, the transmission power of the subcarriers where received quality at base station 200 is below the target quality is controlled based on received quality information 2. The order of processes in ST23 and ST24 may be inverted, or the processes of ST23 and ST24 may be carried out in parallel.

Then, in ST25, a multicarrier signal comprised of the subcarriers subjected to transmission power control in ST23 and ST24 is transmitted to both relay station 150 and base station 200.

In this way, since the mobile station according to the present embodiment controls only the subcarriers where received quality is below the target quality to have a transmission power that minimally satisfies the target quality at the base station, and the rest of the subcarriers (the subcarriers where received quality is equal to or above the target quality) to have a transmission power that minimally satisfies the target quality at the relay station which is provided closer than the base station, and transmits these subcarriers, the transmission power of the mobile station can be reduced, similar to embodiment 1, so that the power consumption of the mobile station is reduced. Also, since only one transmission of a multicarrier signal is required to set the received quality of all subcarriers at the base station to the target quality, the power consumption can be further reduced, compared to the mobile station according to embodiment 1 which requires a second transmission.

Embodiment 3

In embodiment 2 (FIG. 7), since the signal received at base station 200 via relay station 150 may be delayed due to the relay processing by relay station 150, this signal is received later than the signal received directly from mobile station 300. Thus, if a gap appears in the receiving timing between the signals combined at base station 200 and if this gap does not fall within the guard interval length, inter-symbol interference occurs between the two signals, which leads to degradation of reception characteristics.

Mobile station 400 according to the present embodiment transmits the subcarriers set as the object of transmission power control for base station 200, in embodiment 2, with a greater delay than the subcarriers set as the object of transmission power control for relay station 150.

Figure 11:
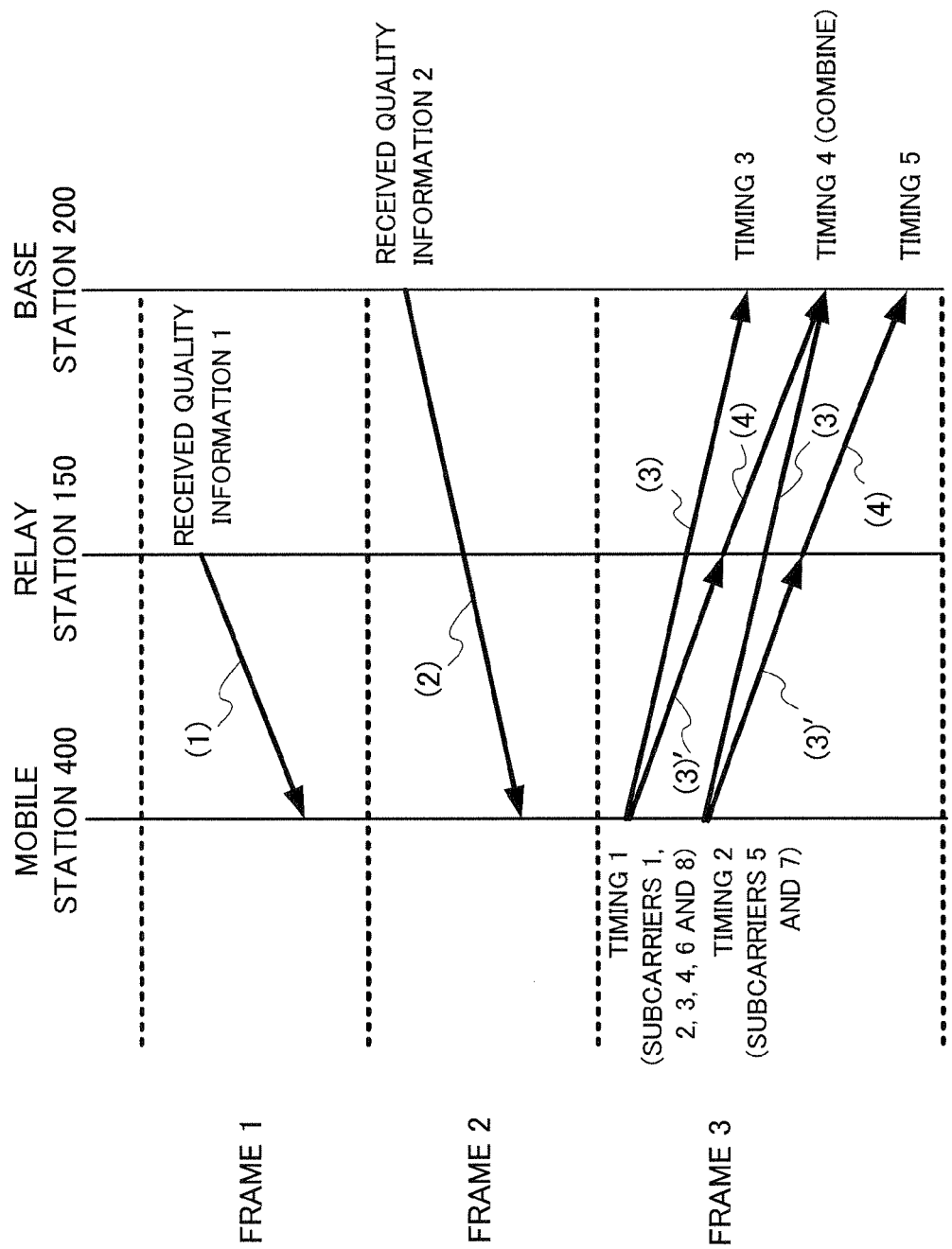
FIG. 11 is a sequence diagram according to embodiment 3.

First, the entire processing of the present embodiment will be described using the sequence diagram shown in FIG. 11.

Processes (1) and (2) in frame 1 and frame 2 are the same as those of embodiments 1 and 2 (FIGS. 2 and 7), and therefore, further description thereof is hereby omitted. Here, similar to embodiments 1 and 2, the subcarriers where received quality is equal to or above the target quality are subcarriers 1, 2, 3, 4, 6 and 8, and the subcarriers where received quality is below the target quality are subcarriers 5 and 7.

At timing 1 in frame 3, mobile station 400 controls the transmission power of subcarriers 1, 2, 3, 4, 6 and 8 where received quality is equal to or above the target quality, based on received quality information 1, and transmits a multicarrier signal comprised of only these subcarriers to both base station 200 and relay station 150 (processes (3) and (3)').

Next, at timing 2 in frame 3, mobile station 400 controls the transmission power of subcarriers 5 and 7 where received quality is below the target quality based on received quality information 2, and transmits a multicarrier signal comprised of only these subcarriers to both base station 200 and relay station 150 (process (3) and (3)').

Here, the time difference (delay) between timing 1 and timing 2 is set to the difference between the timing the signal transmitted from mobile station 400 is directly received at base station 200 and the timing the signal transmitted from mobile station 400 is received at base station 200 via relay station 150, or is set within a guard interval length. This time difference which takes into account the relay process time at relay station 150 is measured in advance at base station 200, and a signal showing the measured time difference may be transmitted, together with received quality information 2, to mobile station 400, in process (2).

Further, in frame 3, relay station 150 relays the multicarrier signal transmitted at timing 1 and the multicarrier signal transmitted at timing 2, and transmits these signals to base station 200 (process (4)).

Figure 12:
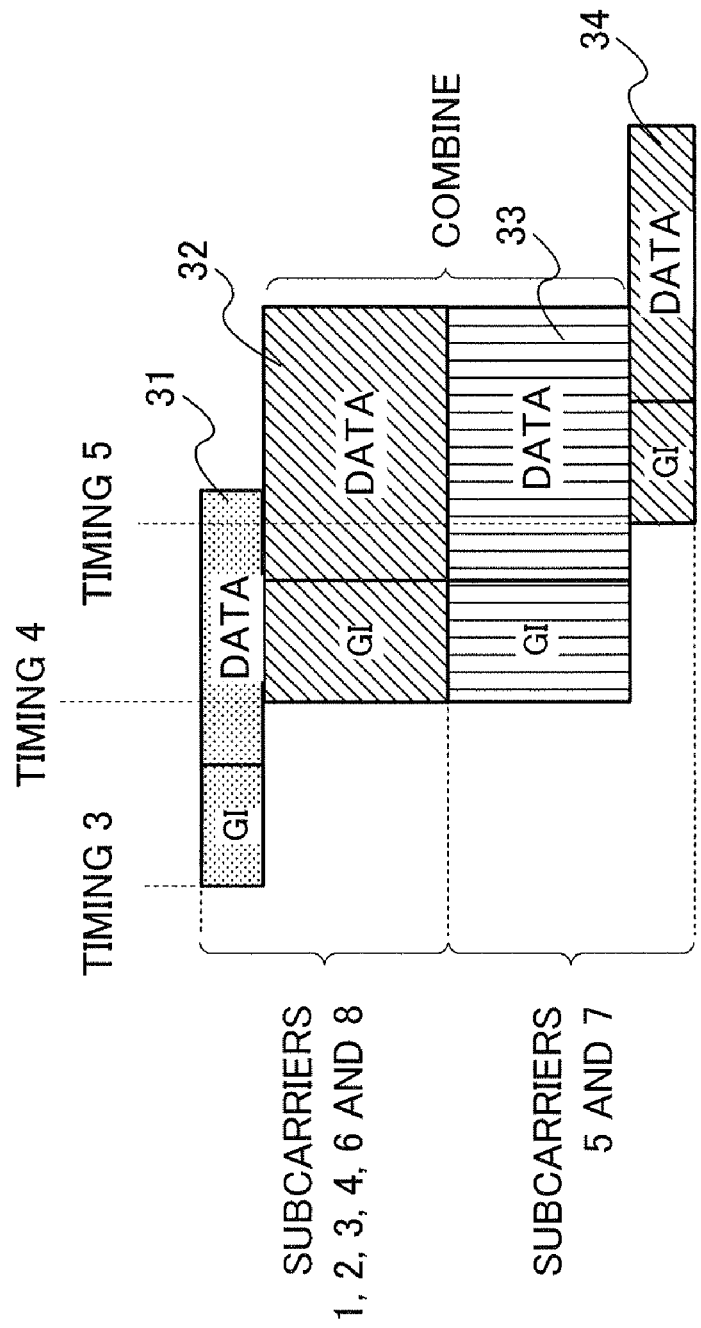
FIG. 12 is an operation explanation diagram according to embodiment 3.

Thus, if the delay of timing 2 relative to timing 1 at mobile station 400 is set to the difference of receiving timing at base station 200, as shown in FIG. 12, the signals (31 in FIG. 12) of the multicarrier signal transmitted at timing 1 (e.g., subcarriers 1, 2, 3, 4, 6, and 8), which are received directly at base station 200, are received at timing 3, the signals (32 of FIG. 12) received via relay station 150 are received at timing 4, the signals (33 of FIG. 12) of the multicarrier signal transmitted at timing 2 (subcarriers 5 and 7), which are directly received are received at timing 4, and the signals (34 in FIG. 12) received via relay station 150, are received at timing 5. Here, base station 200 combines the two multicarrier signals received at the same timing at timing 4 (32 and 33 in FIG. 12) on a per subcarrier basis and obtains received data.

Figure 13:
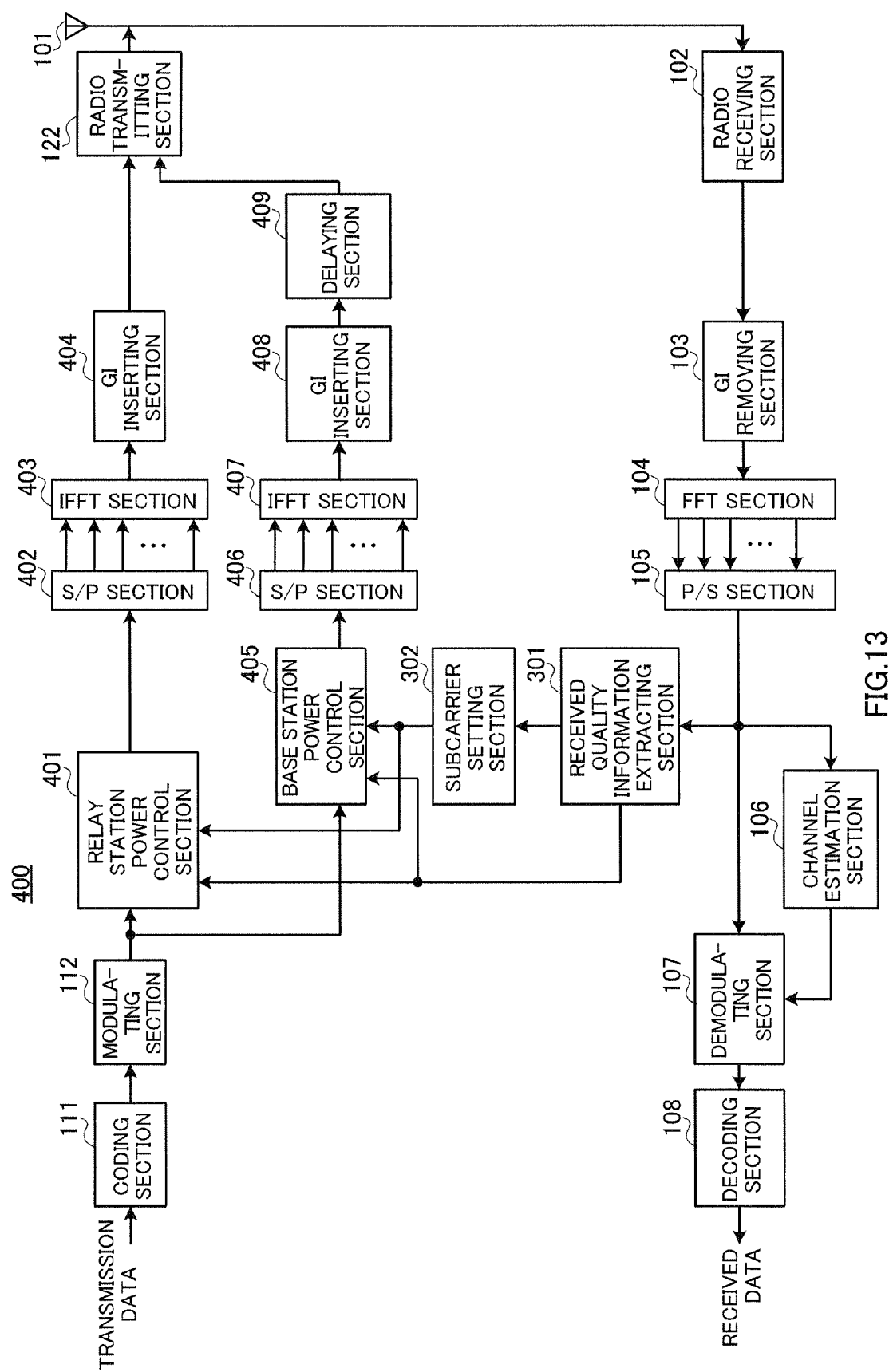
FIG. 13 is a block diagram showing a configuration of a mobile station according to embodiment 3.

Next, the configuration of mobile station 400 will be described. The configuration of mobile station 400 is shown in FIG. 13. Components of FIG. 13 that are the same as those of embodiment 2 (FIG. 9) are denoted by the same numeric symbol, and further description thereof is hereby omitted.

In mobile station 400, relay station power control section 401 controls, as described above, the transmission power of the signals, from the inputted subcarrier signals, allocated to the subcarriers where received quality is equal to or above the target quality, based on received quality information 1, and inputs these signals to S/P section 402. At this time, relay station power control section 401 sets the transmission power of the signals allocated to the subcarriers where received quality is below the target quality, to zero. That is, only the signals allocated to the subcarriers where received quality is equal to or above the target quality are inputted from relay station power control section 401 to S/P section 402.

S/P section 402 converts the subcarrier signals inputted in series from relay station power control section 401 into parallel signals and inputs these parallel signals to IFFT section 403.

IFFT section 403 performs IFFT processing on the inputted signals, in which the frequency domain signals are converted into a time domain multicarrier signal, and inputs this signal to GI inserting section 404. By this means, the multicarrier signal generated at IFFT section 403 includes only subcarriers where received quality is equal to or above the target quality.

GI inserting section 404 inserts a guard interval into the multicarrier signal inputted from IFFT section 403 and outputs this signal to radio transmitting section 122.

On the one hand, base station power control section 405 controls, as described above, the transmission power of the signals, from amongst the inputted subcarriers signals, allocated to the subcarriers where received quality is below the target quality, based on received quality information 2, and inputs these signals to S/P section 406. At this time, base station power control section 405 sets the transmission power of the signals allocated to the subcarriers where received quality is equal to or above the target value, to zero. That is, only the signals allocated to the subcarriers where received quality is equal to or above the target quality are inputted from base station power control section 405 to S/P section 406.

S/P section 406 converts the subcarrier signals inputted in series from base station power control section 405 into parallel signals, and inputs these parallel signals to IFFT section 407.

IFFT section 407 performs IFFT processing on the inputted signals, in which the frequency domain signals are converted into a time domain multicarrier signal, and inputs the converted signal to GI inserting section 408. Thus, the multicarrier signal generated by IFFT section 407 includes only the subcarriers where received quality is below the target quality.

GI inserting section 408 inserts a guard interval into the multicarriers signal inputted from IFFT section 407 and inputs this signal to delaying section 409.

Delaying section 409 delays the multicarrier signal inputted from GI inserting section 408, and inputs the delayed signal to radio transmitting section 122. As a result of this delaying process, the signal generated by IFFT section 407 is transmitted later than the signal generated by IFFT section 403. Also, the delay of the transmission timing is set to the difference between the timing the signal generated by IFFT section 403 is received directly at base station 200, and the timing the signal generated by IFFT section 407 is received at base station 200, via relay station 150, or is set within a guard interval length.

Figure 14:
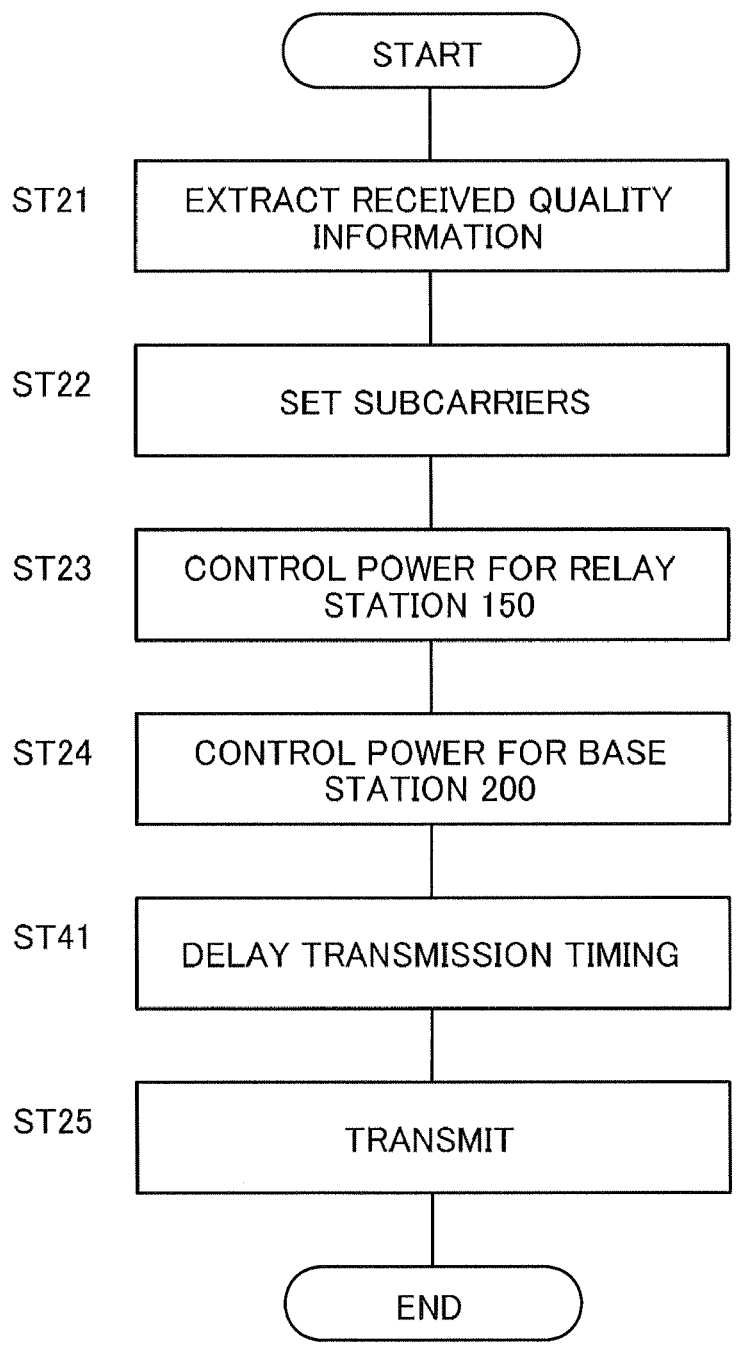
FIG. 14 is an operation flow diagram of a mobile station according to embodiment 3.

Next, the operation flow of mobile station 400 will be described based on the flow chart of FIG. 14. Here, the steps in FIG. 14 which represent the same operations as those of embodiment 2 (FIG. 10) are designated with the same numeric symbols, and further description thereof is hereby omitted.

In ST41, the transmission timing of the multicarrier signal comprising the subcarriers which become the object of transmission power control in ST24, is delayed.

Thus, with the present embodiment, the base station receives a plurality of signals that are to be combined, that is, the multicarrier signal that is received directly from the mobile station and the multicarrier signal that is received via the relay station, at the same timing, or within a delay less than a guard interval length, it is possible to avoid deterioration of reception characteristics caused by inter-symbol interference.

Although a description is given in the above-described embodiments of the case that the signal transmitted from the mobile station is received at the base station via the relay station (e.g., uplink relay), these embodiments can also be applied in a similar way to the case that the signal transmitted from the base station is received at the mobile station via the relay station (e.g., downlink relay). If these embodiments are applied to a downlink relay, the mobile station may be considered as the base station, and the base station may be considered as the mobile station, in these embodiments.

Also, in the above-described embodiments, the received intensity level is used as received quality, however, SIR, SNR, SINR or the amount of interference and the like, may be used as received quality.

In the above-described embodiments, other relay stations may be present between the relay station and the base station, or between the mobile station and the base station. Also, the signal from the mobile station may be received at the base station via a plurality of relay stations.

Also, the transmission of the received quality information may be carried out per frame or once every plurality of frames. Similarly, the selection or setting of the subcarriers may be updated per frame or once every plurality of frames.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-078848, filed on Mar. 18, 2005, the entire content of which is expressly incorporated by reference herein.

INDUSTRIAL APPLICABILITY

The present invention can be applied to communications systems (for instance, multi-hop systems) or the like, in which a radio communication apparatus such as a mobile station, a base station or the like performs radio communication via a relay station.

The invention claimed is:

1. A mobile station apparatus used in a mobile communication system in which the mobile station apparatus transmits a multicarrier signal and in which a base station apparatus combines a multicarrier signal received directly from the mobile station apparatus and a multicarrier signal received from the mobile station apparatus via a relay station apparatus, to obtain received data, the mobile station apparatus comprising:

a control section that controls a transmission power of each of a plurality of subcarriers forming the multicarrier signal, in accordance with channel quality between the relay station apparatus and the base station apparatus; and a transmitting section that transmits the multicarrier signals comprising the subcarriers subjected to the transmission power control.

2. The mobile station apparatus of claim 1, wherein the transmitting section transmits a multicarrier signal comprising all of the plurality of subcarriers in a first transmission and transmits a multicarrier signal comprising subcarriers where channel quality is below target quality in a second transmission.

3. The mobile station apparatus of claim 2, wherein, in the second transmission, the control section controls a transmission power of the subcarriers where channel quality is below the target quality to be greater than a transmission power in the first transmission.

4. The mobile station apparatus of claim 1, wherein the control section controls a transmission power of a first subcarrier where channel quality is below the target quality to be greater than a transmission power of a second subcarrier where channel quality is equal to or above the target quality.

5. The mobile station apparatus of claim 4, wherein the transmitting section transmits a multicarrier signal comprising both the first subcarrier and the second subcarrier.

6. The mobile station apparatus of claim 1, wherein the control section controls the transmission power of first subcarrier where channel quality is below the target quality, based on the channel quality, and controls the transmission power of second subcarrier where channel quality is equal to or above the target quality, based on channel quality between the mobile station apparatus and the relay station apparatus.

7. The mobile station apparatus of claim 6, wherein the transmitting section transmits a multicarrier signal comprising both the first subcarrier and the second subcarrier.

8. The mobile station apparatus of claim 1, further comprising a delaying section that delays a transmission timing of a multicarrier signal comprising only subcarriers where channel quality is below the target quality, wherein the transmitting section transmits the multicarrier signal comprising only the subcarriers where channel quality is below the target quality later than a multicarrier signal comprising only subcarriers where channel quality is equal to or above the target quality.

9. The mobile station apparatus of claim 8, wherein the delaying section sets the delay of the transmission timing within a guard interval length.

10. A wireless communication method in which a mobile station apparatus transmits a multicarriers signal and in which a base station apparatus combines a multicarrier signal received directly from the mobile station apparatus and a multicarrier signal received from the mobile station apparatus via a relay station apparatus, to obtain received data, wherein the mobile station apparatus transmits a multicarrier signal in which a transmission power of each subcarrier is controlled in accordance with channel quality between the relay station apparatus and the base station apparatus.

* * * * *